United States Patent [19]
Funk et al.

[11] Patent Number: 6,036,845
[45] Date of Patent: Mar. 14, 2000

[54] MODIFIED RISER-REACTOR REFORMING PROCESS WITH PREREACTOR

[75] Inventors: Gregory A. Funk, Carol Stream; Christopher D. Gosling, Roselle; Paula L. Bogdan, Mount Prospect, all of Ill.

[73] Assignee: UOP LLC, Des Plaines, Ill.

[21] Appl. No.: 09/072,444

[22] Filed: May 4, 1998

[51] Int. Cl.[7] .......................... C10G 35/04; C10G 35/06; B01J 23/90
[52] U.S. Cl. ................... 208/65; 208/63; 208/64; 208/135; 208/137; 208/138; 208/139; 208/140
[58] Field of Search .................... 208/63, 64, 65, 208/135, 137, 138, 139, 140

[56] References Cited

U.S. PATENT DOCUMENTS

| | | | |
|---|---|---|---|
| 3,033,780 | 5/1962 | McGrath et al. | 208/136 |
| 3,776,838 | 12/1973 | Youngblood et al. | 208/74 |
| 3,849,289 | 11/1974 | Voorhies | 208/65 |
| 3,864,240 | 2/1975 | Stone | 208/64 |
| 5,030,782 | 7/1991 | Harandi et al. | 585/322 |
| 5,565,090 | 10/1996 | Gosling et al. | 208/134 |

*Primary Examiner*—Walter D. Griffin
*Assistant Examiner*—Tam M. Nguyen
*Attorney, Agent, or Firm*—Thomas K. McBride; John P. Spears, Jr.; Richard E. Conser

[57] ABSTRACT

A catalytic reforming process comprises a prereactor which provides an intermediate stream to a riser reactor with multiple catalyst injection points to obtain high aromatics yields from a naphtha feedstock. Product from the riser reactor typically is discharged into a fluidized-bed reforming reactor, in which the reforming reaction is completed and catalyst is separated from hydrogen and hydrocarbons. Hydrocarbons from the reactor are separated to recover an aromatized product. Catalyst is regenerated to remove coke and reduced for reuse in the reforming process.

20 Claims, 3 Drawing Sheets

MODIFIED RISER-REACTOR REFORMING PROCESS WITH PREREACTOR

FIELD OF THE INVENTION

This invention relates generally to processes for the conversion of hydrocarbons, and more specifically to improved processes for the catalytic reforming of naphtha feedstocks.

BACKGROUND OF THE INVENTION

The modern era of catalytic reforming for high-octane gasoline began in 1949 with the introduction of platinum-containing catalysts, which swept the industry during the 1950's and continue to form the basis of modern reforming catalysts and processes. Fluidized-bed catalytic reforming, often characterized as fluid hydroforming, was known from the early days of catalytic reforming. This technology failed to play a prominent part in the commercial arena and has been in decline, even though it is based on the attractive concept of flexibility in operating conditions and ready removal and regeneration of catalyst. Problems relating to temperature control in relation to the endothermic heat of reaction, stripping, regenerating and returning catalyst in different atmospheres, and the recovery of catalyst fines are believed to be factors in the lack of widespread success. More recently, moving-bed catalytic reforming units associated with continuous catalyst regeneration have addressed these problems and dominated new-unit construction.

Catalytic reforming involves a number of competing processes or reaction sequences. These include dehydrogenation of cyclohexanes to aromatics, dehydroisomerization of alkylcyclopentanes to aromatics, dehydrocyclization of an acyclic hydrocarbon to aromatics, hydrocracking of paraffins to light products boiling outside the gasoline range, dealkylation of alkylbenzenes and isomerization of paraffins. Some of the reactions occurring during reforming, such as hydrocracking which produces light paraffin gases, have a deleterious effect on the yield of products boiling in the gasoline range. Process improvements in catalytic reforming thus are targeted toward enhancing those reactions effecting a higher yield of the gasoline fraction at a given octane number.

Programs to improve catalytic-reforming performance of are being stimulated by the reformulation of gasoline, following upon widespread removal of lead antiknock additive, in order to reduce harmful vehicle emissions. Gasoline-upgrading processes such as catalytic reforming must operate at ever-higher efficiency with greater flexibility in order to meet these changing requirements. The lowering of operating pressure, maintenance of catalyst selectivity, and attention to reaction-temperature optimization are important parameters in achieving improvements in the reforming process. Fluidized-bed reforming offers the potential for exploiting these parameters.

U.S. Pat. No. 3,033,780 (McGrath et al.) teaches fluid hydroforming of a light hydrocarbon oil to obtain a high anti-knock motor fuel. The hydrocarbon oil and a hydrogen-containing gas are supplied separately to a reaction zone, with the gas being heated to a higher temperature than the oil to supply a portion of the endothermic heat of reaction. Catalyst particles are withdrawn, stripped, regenerated and recycled. Reaction products exchange heat with the feed and are withdrawn and separated.

U.S. Pat. No. 3,776,838 (Youngblood et al.) discloses catalytic cracking of naphtha with a zeolite cracking catalyst in successive elongated reaction zones followed by a catalyst phase in a reactor. A fraction boiling between 100° and 450° F. is recovered from the reaction mixture from the first elongated zone and introduced along with zeolite catalyst to the second elongated zone.

U.S. Pat. No. 5,565,090 (Gosling et al.) teaches a reforming process comprising a riser reactor in combination with a fluidized-bed reforming vessel and catalyst regeneration, with separation of effluent to recover an aromatized product.

U.S. Pat. No. 3,849,289 (Voorhies) teaches staged reforming with a fluidized bed preceding a plurality of fixed-bed stages for dehydrocyclization; hydrogen and optionally aromatics are separated before the effluent is sent to the fixed-bed second zone. U.S. Pat. No. 3,864,240 (Stone) discloses a plurality of fixed-bed reaction zones followed by a second reaction zone containing a bed of catalyst movable downwardly via gravity flow. U.S. Pat. No. 5,030,782 (Harandi et al.) teaches a two-stage conversion process in which aliphatics are cracked and dehydrogenated in a fluid bed to yield an intermediate product which is processed with an aromatization catalyst; $C_4$-olefins are formed in the cracking/dehydrogenation zone, reacting in the aromatization zone to provide a portion of the endothermic heat of reaction.

The problem facing workers in the art is to find modifications to the known fluidized-bed technology which would render it commercially attractive in today's environment of alternative catalytic reforming processes, gasoline specifications and aromatics needs. One specific problem not addressed by the cited art is control of heat input to a fluidized-bed reactor in light of the thermodynamics and kinetics of the catalytic-reforming reaction.

SUMMARY OF THE INVENTION

An object of this invention is an improved process for aromatics production and upgrading of gasoline product. More specifically, the invention is directed to an economically attractive fluidized-bed process to obtain high yields of aromatics and/or gasoline from the catalytic reforming of a hydrocarbon feedstock. It has been observed that catalytic reforming in a fluidized catalyst bed contained in an elongated riser reactor with multiple catalyst injection points results in favorable yields and catalyst utilization and that addition of a prereactor zone can increase conversion.

A broad embodiment of the invention is a reforming process that converts a hydrocarbon feedstock in a prereactor zone followed by a riper reactor comprising multiple catalyst-injection points to obtain an aromatics-rich aromatized product. Optimally the reforming is effected in the substantial absence of added hydrogen, with an inlet molar ratio of hydrogen to naphtha feedstock of no more than about 0.3. The prereactor zone preferably contains catalyst in a fixed bed, but optionally may comprise a moving-bed reactor. A hydrocarbon vapor product from the riser reactor is separated to recover the aromatized product. The riser reactor preferably discharges into a fluidized-bed reforming vessel in which some additional conversion to aromatics takes place, with reactor effluent from this vessel passing to product recovery. A spent equilibrium catalyst is separated from the reactor effluent, stripped of residual hydrocarbons and sent to regeneration. Coke is removed from the spent catalyst by combustion with oxygen followed by optional catalyst reconditioning to redistribute and reduce metals prior to returning catalyst to the riser reactor.

Another aspect of this invention is a catalyst suitable for efficient and selective conversion of a naphtha feedstock in a fluidized bed. Preferably the catalyst comprises a refractory inorganic oxide, and optionally contains a platinum-group metal and one or more other metals. In an alternative embodiment, the catalyst comprises molybdenum or nickel sulfide.

Other objects, embodiments and details of this invention are set forth in the following detailed description of the invention.

DESCRIPTION OF THE PREFERRED EMBODIMENTS

The present invention usually is practiced in the context of an integrated fluidized-bed reforming unit including product separation and catalyst regeneration and reconditioning. A riser reactor generally is the primary device effecting reforming reactions. Reforming reactions usually are concluded in a reactor vessel comprising a catalyst-separation device which removes catalyst particles from reactor-effluent vapors. A stripping zone removes residual adsorbed hydrocarbons from the catalyst. Spent catalyst from the stripping zone is regenerated in a regeneration zone having one or more stages of regeneration. Regenerated catalyst from the regeneration zone re-enters the reactor riser to continue the process. The reactor effluent is separated into a gaseous product, light hydrocarbons and aromatized product; the aromatized product has an unusually high aromatics content relative to, e.g., gasoline derived from conventional reforming or fluid catalytic cracking.

Catalytic reforming generally is applied to a feedstock rich in paraffinic and naphthenic hydrocarbons and is effected through diverse reactions, e.g., dehydrogenation of naphthenes to aromatics, dehydrocyclization of paraffins, isomerization of paraffins and naphthenes, dealkylation of alkylaromatics, hydrocracking of paraffins to light hydrocarbons, and formation of coke which is deposited on the catalyst. Considerable leverage exists for increasing desired product yields from catalytic reforming by promoting the dehydrocyclization reaction over the competing hydrocracking reaction while minimizing the formation of coke.

The hydrocarbon feedstock to the present reforming process comprises paraffins and naphthenes, and may comprise aromatics and small amounts of olefins, preferably boiling within the gasoline range. Feedstocks which may be utilized include straight-run naphthas, natural gasoline, synthetic naphthas, thermal gasoline, catalytically cracked gasoline, partially reformed naphthas or raffinates from extraction of aromatics. Paraffins typically comprise 40–99 mass %, naphthenes 1–60 mass-% and aromatics 0–50 mass-% of the hydrocarbon feedstock; the olefin content is usually less than about 3 mass-% unless the feedstock comprises a thermally or catalytically cracked component. The distillation range may be that of a full-range naphtha, having an initial boiling point typically from about 40° to 100° C. and a final boiling point of from about 160° to 210° C., or it may represent a narrower-range naphtha having a higher initial and/or lower final boiling point. When the product objective is aromatics for chemical uses, for example, the initial boiling point usually is within the range of about 50°–80° C. and the final boiling point in the range of about 110°–160° C.

An untreated feedstock to the present process usually contains sulfur compounds, amounting to generally less than 1 mass % and more usually less than 1000 mass parts per million (ppm) on an elemental basis. The untreated feedstock optionally may be suitable for the present process if a catalyst is utilized which is not deactivated thereby, as discussed hereinbelow. Preferably the hydrocarbon feedstock has been prepared by a conventional pretreating step such as hydrotreating, hydrorefining or hydrodesulfurization to convert such contaminants as sulfurous, nitrogenous and oxygenated compounds to $H_2S$, $NH_3$ and $H_2O$, respectively, which then can be separated from the hydrocarbons by fractionation, and to saturate olefins. This pretreating preferably will employ a catalyst known to the art comprising an inorganic oxide support and metals selected from Groups VIB(IUPAC 6) and VIII(IUPAC 9–10) of the Periodic Table [See Cotton and Wilkinson, *Advanced Inorganic Chemistry*, John Wiley & Sons (Fifth Edition, 1988)]. Alternatively or in addition to the conventional hydrotreating, the pretreating step may comprise contact with sorbents capable of removing sulfurous and other contaminants. These sorbents may include but are not limited to one or more of zinc oxide, iron sponge, high-surface-area sodium, high-surface-area alumina, nickel-on-alumina, activated carbons and molecular sieves. Preferably, the pretreating step will provide the reforming catalyst with a hydrocarbon feedstock having sulfur levels of less than 10 and preferably less than 1 mass ppm; sulfur levels of 0.5 to 0.15 ppm are usually achieved in modern pretreating units.

The hydrocarbon feedstock is charged to a prereactor zone, wherein it contacts a prereactor catalyst at prereactor conditions to obtain a prereacted intermediate to be processed in a riser reactor and/or by fluidized-bed reforming. When processing a feedstock as described herein directly in a riser reactor or fluidized-bed reforming reactor, it is difficult to add heat at a sufficient rate to maintain high conversion. A substantial portion of the endothermic reforming reaction is in relatively rapid reactions, particularly the dehydrogenation of naphthenes, and the use of a prereactor zone therefore effects a substantial portion of the endothermic reaction thus permitting reheat to reaction temperature prior to fluidized-bed reforming and concomitant facilitation of temperature/conversion control in the riser or fluidized bed.

Figure 1:
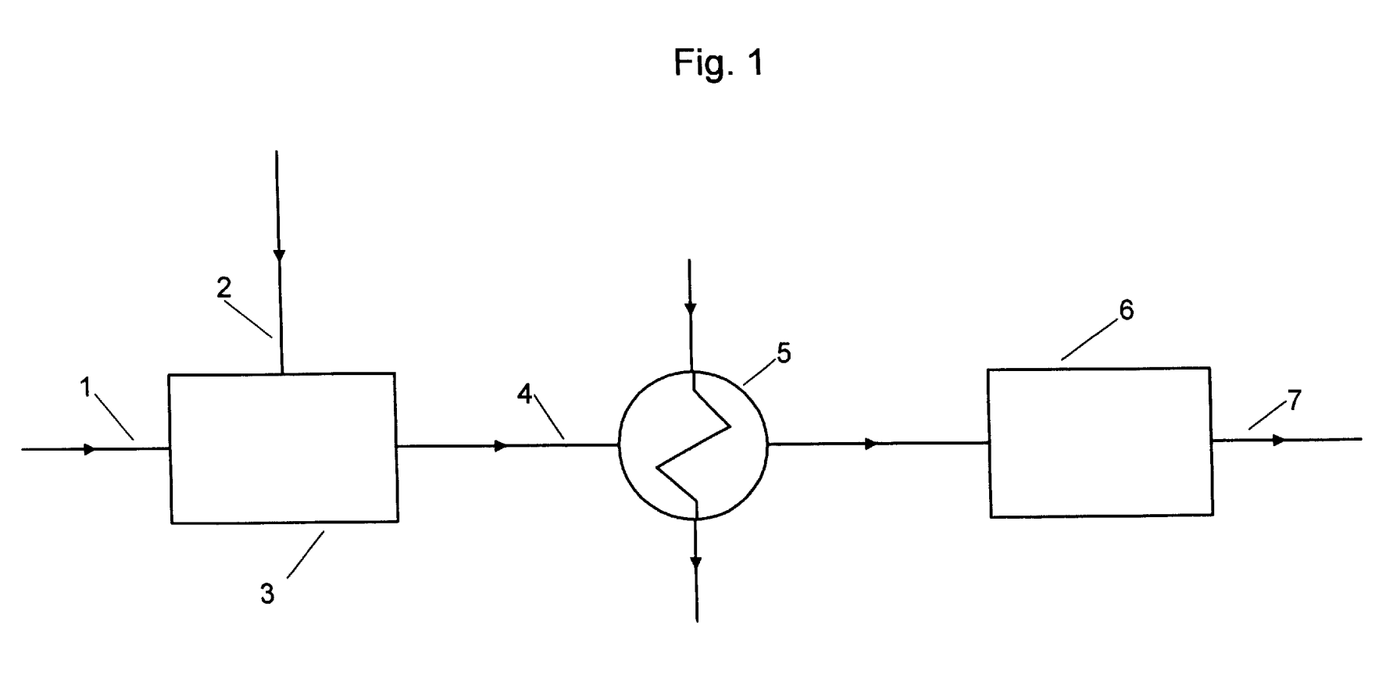
FIG. 1 is a simplified representation of a prereactor zone in conjunction with a riser reactor or fluidized-bed reformer.

FIG. 1 is a simplified block-flow representation of the arrangement of the prereactor zone relative to a riser reactor or fluidized-bed reactor. The hydrocarbon feedstock 1, preferably in admixture with free hydrogen 2 contacts a prereactor catalyst in one or more reactors of the prereactor zone 3. The feedstock reacts in the prereactor zone to form prereacted intermediate 4. This intermediate stream leaves the reactors with a reduced temperature relative to the feedstock due to the endothermic heat of reaction, and is heated via exchanger 5 and charged to the riser reactor and/or fluidized-bed reactor 6 to yield aromatized product 7 as described hereinafter in connection with FIG. 2. The heat supplied in exchanger 5 to the prereacted intermediate stream may be from any suitable source, such as process streams or a heater; integration with a catalyst regeneration zone described hereinafter to supply heat from the combustion of catalyst deposits would be a preferred option.

The prereactor zone comprises one or a plurality of either fixed-bed reactors and/or moving-bed reactors whereby catalyst may be continuously withdrawn and added. These alternatives are associated with catalyst-regeneration options known to those of ordinary skill in the art, such as: (1) a semiregenerative unit containing fixed-bed reactors, which maintains operating severity by increasing temperature, eventually shutting the unit down for catalyst regeneration and reactivation; (2) a swing-reactor unit, in which individual fixed-bed reactors are serially isolated by manifolding arrangements as the catalyst becomes deactivated and the catalyst in the isolated reactor is regenerated and reactivated while the other reactors remain on-stream; (3) continuous regeneration of catalyst withdrawn from a moving-bed reactor, with reactivation and substitution of the reactivated catalyst, which permits higher operating severity by maintaining high catalyst activity through regeneration cycles of a few days; or, (4) a hybrid system with semiregenerative and continuous-regeneration provisions in the same unit. The prereactor zone therefore comprises one or more of the group consisting of the above fixed-bed and moving-bed reactors. The feedstock may contact the catalyst in the reactors in either upflow, downflow, or radial-flow mode.

The feedstock, preferably in combination with free hydrogen supplied by recycle of hydrogen generated in the prereactor zone, riser reactor and/or fluid-bed reactor, contacts the prereactor catalyst in the prereactor zone to effect a variety of reforming reactions. Among reforming reactions are dehydrogenation of naphthenes, isomerization, cracking and dehydrocyclization of aliphatics. The fast and endothermic naphthene-dehydrogenation reaction tends to be the dominant prereactor reaction when processing naphthene-containing feedstocks, with a concomitant substantial lowering of the temperature of the prereactor intermediate relative to the feedstock to the prereactor zone.

Prereactor conditions comprise a pressure of from about 100 kPa to 6 MPa absolute and preferably from about 100 kPa to 2 MPa absolute; because low pressures are favored for the add-on aromatization zone, operating pressures of less than 1 MPa are especially preferred. Free hydrogen suitably is present in a molar ratio to the hydrocarbon feedstock of from about 0.1 to 10. Space velocity with respect to the volume of reforming catalyst is from about 0.2 to 20 $hr^{-1}$. Operating temperature is from about 260° to 560° C. and preferably from about 400° to 560° C.

The prereactor catalyst utilized in the prereactor zone comprises a supported platinum-group metal component. The prereactor catalyst may be a dual-function composite containing a platinum-group metal component on a refractory support which provides acid sites for cyclization, cracking and isomerization. Alternatively, the prereactor catalyst comprises a nonacidic molecular-sieve catalyst selective for dehydrocyclization.

The refractory support of a dual-function prereactor catalyst should be a porous, adsorptive, high-surface-area material which is uniform in composition without composition gradients of the species inherent to its composition. Within the scope of the present invention are refractory support containing one or more of: (1) refractory inorganic oxides such as alumina, silica, titania, magnesia, zirconia, chromia, thoria, boria or mixtures thereof; (2) synthetically prepared or naturally occurring clays and silicates, which may be acid-treated; (3) crystalline zeolitic aluminosilicates, either naturally occurring or synthetically prepared such as FAU, LTL, MAZ, MEL, MFI, MOR, MTW (IUPAC Commission on Zeolite Nomenclature), in hydrogen form or in a form which has been exchanged with metal cations; (4) spinels such as $MgAl_2O_4$, $FeAl_2O_4$, $ZnAl_2O_4$, $CaAl_2O_4$; (5) non-zeolitic molecular sieves as disclosed in U.S. Pat. No. 4,741,820 which is incorporated by reference; and (6) combinations of materials from one or more of these groups. The preferred refractory support for the reforming catalyst is alumina, with gamma- or eta-alumina being particularly preferred.

The alumina powder may be formed into any shape or form of carrier material known to those skilled in the art such as spheres, extrudates, rods, pills, pellets, tablets or granules. Spherical particles may be formed by converting the alumina powder into alumina sol by reaction with suitable peptizing acid and water and dropping a mixture of the resulting sol and gelling agent into an oil bath to form spherical particles of an alumina gel, followed by known aging, drying and calcination steps. The extrudate form is preferably prepared by mixing the alumina powder with water and suitable peptizing agents, such as nitric acid, acetic acid, aluminum nitrate and like materials, to form an extrudable dough having a loss on ignition (LOI) at 500° C. of about 45 to 65 mass %. The resulting dough is extruded through a suitably shaped and sized die to form extrudate particles, which are dried and calcined by known methods. Alternatively, spherical particles can be formed from the extrudates by rolling the extrudate particles on a spinning disk.

An alternative prereactor catalyst comprises a non-acidic zeolitic aluminosilicate, optimally a non-acidic L-zeolite which has substantially all of its cationic exchange sites occupied by nonhydrogen species. Preferably the cations occupying the exchangeable cation sites will comprise one or more of the alkali metals, with potassium-form L-zeolite being especially preferred. Usually the L-zeolite is composited with a binder in order to provide a convenient form for use in the catalyst of the present invention, with one or more of silica, alumina or magnesia being preferred binder materials and amorphous silica being especially preferred The zeolite and binder may be composited to form the desired catalyst shape by any method known in the art, with an extrudate being favored and spherical particles being a useful alternative. An additional alkali-metal component usually is present, for example a surface-deposited alkali metal as described in U.S. Pat. No. 4,619,906.

A catalytically effective amount of a platinum-group metal component is an essential feature of the prereactor catalyst, with a platinum component being preferred. The platinum-group metal component may be incorporated in the catalyst in any suitable manner such as but not limited to coprecipitation, ion exchange or impregnation with a soluble, decomposable compound of the metal. The platinum-group metal may exist within the catalyst as a compound such as the oxide, sulfide, halide, or oxyhalide, in chemical combination with one or more other ingredients of the catalytic composite, or as an elemental metal. Best results are obtained when substantially all of the metal exists in the catalytic composite in a reduced state. The preferred platinum component generally comprises from about 0.01 to 5 mass % of the catalytic composite, preferably 0.05 to 2 mass %, calculated on an elemental basis.

It is within the scope of the present invention that the prereactor catalyst contains a metal promoter to modify the effect of the preferred platinum component. Such metal modifiers may include Group IVA (IUPAC 14) metals, other Group VIII (IUPAC 8–10) metals, rhenium, indium, gallium, zinc, uranium, dysprosium, thallium and mixtures thereof. Preferred metal promoters are tin, germanium, rhenium and indium. Catalytically effective amounts, between 0.01 and 5 mass % on an elemental basis, of such metal modifiers may be incorporated into the catalyst by any means known in the art.

A dual-function prereactor catalyst may contain a halogen component. The halogen component may be either fluorine, chlorine, bromine or iodine or mixtures thereof with chlorine being preferred. The optional halogen +component is generally present in a combined state with the inorganic-oxide support. The halogen component is preferably well dispersed throughout the catalyst and, if present, may comprise from more than 0.2 to about 15 wt. %. calculated on an elemental basis, of the final catalyst.

The prereactor catalyst generally will be dried at a temperature of from about 100° to 320° C. for about 0.5 to 24 hours, followed by oxidation at a temperature of about 300° to 550° C. in an air atmosphere for 0.5 to 10 hours. Preferably the oxidized catalyst is subjected to a substantially waterfree reduction step at a temperature of about 300° to 550° C. for 0.5 to 10 hours or more. Further details of the preparation and activation of embodiments of the prereactor catalyst are disclosed in U.S. Pat. No. 4,677,094 (Moser et al.), which is incorporated into this specification by reference thereto.

The prereactor intermediate stream is charged to a riser reactor and/or a fluidized-bed reactor. Preferably the intermediate stream is charged to the riser reactor without separation of free hydrogen. Although the use of the prereactor is described in the context of a riser-reactor optionally followed by a fluidized-bed reforming vessel, the invention is not limited thereby. The prereactor concept also is useful in mitigating the effects of the endothermic heat of reaction on fluidized-bed reforming processes of the art.

Figure 2:
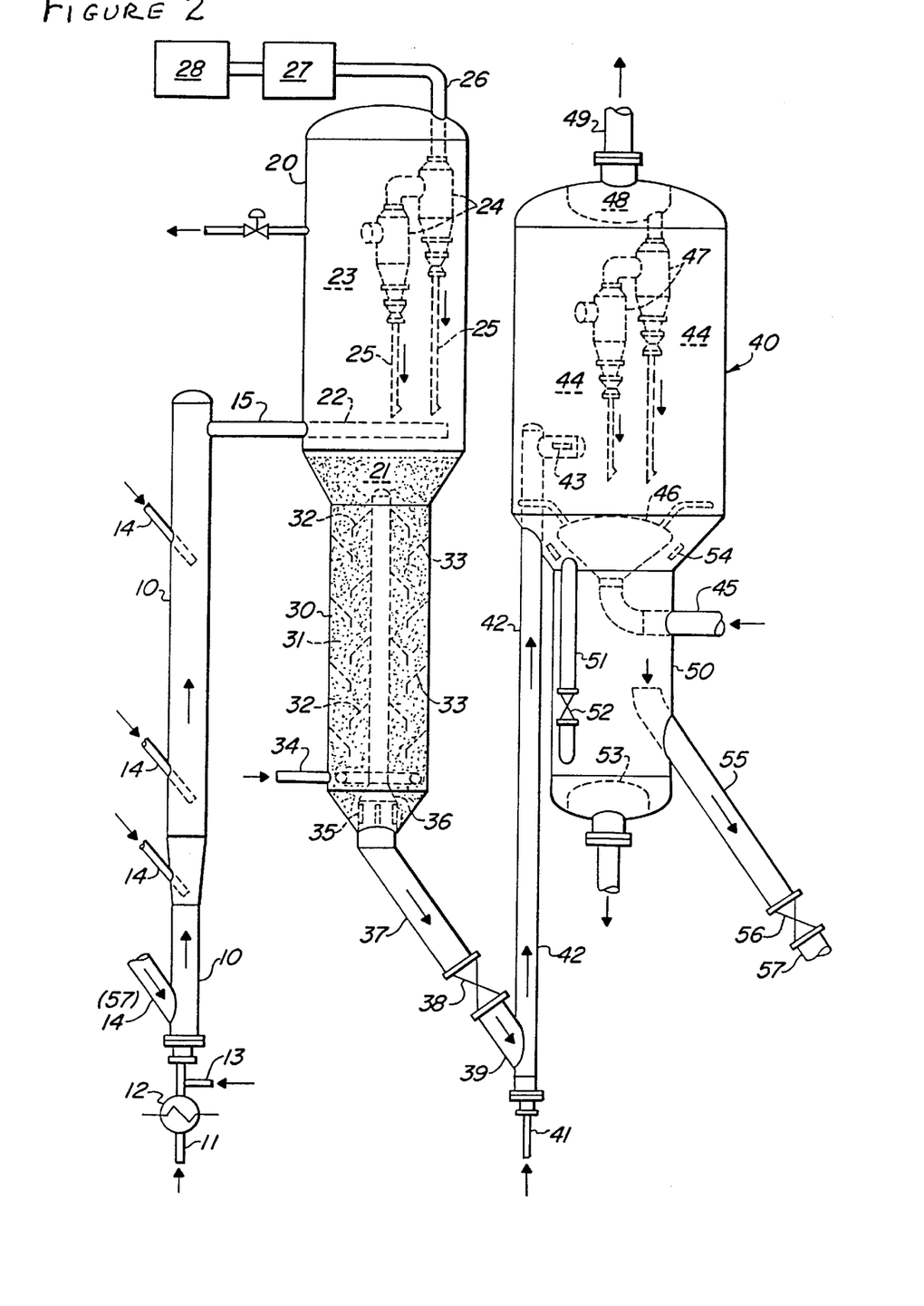
FIG. 2 is a schematic diagram of a riser-reactor reforming unit showing the relationship of the riser reactor, reactor vessel, product separation and catalyst regeneration.

Essential and preferred embodiments of the riser reactor, fluidized-bed vessel and catalyst reconditioning are illustrated with reference to FIG. 2. Catalytic reforming is effected in a riser reactor 10 in which a hydrocarbon feedstock is transported upwardly along with fluidized catalyst and reforming reactants to obtain a riser vapor product stream. The hydrocarbon feedstock is charged to the riser reactor via conduit 11, which may comprise any device such as a multiplicity of nozzles that provides a suitable distribution of the feedstock over the entire cross-section of the riser. The feedstock preferably has been heated in preheater 12, optionally via heat exchange with reactor effluent from the fluidized-bed reforming vessel or other process streams. The temperature of the hydrocarbon feedstock entering the riser reactor is within the range of 350°–600° C., preferably from 450°–560° C., to avoid undesirable cracking reactions. The feedstock optionally comprises hydrogen supplied in an amount of from about 0.1 to 5 moles per mole of hydrocarbon via conduit 13 after having been separated in a gas stream from the reactor effluent, recycled and heated, but hydrogen preferably is not added to the feedstock. Some hydrogen may be present in the regenerated catalyst following a reduction step, but such hydrogen is present in an amount less than about 0.3 moles per mole of hydrocarbon and usually no more than about 0.1 mole per mole of hydrocarbon.

The feedstock flows upwardly through the riser reactor into which regenerated and reduced catalyst joins the feedstock at the base of the riser reactor. Preferably catalyst particles are injected at multiple injection points 14, i.e., into the resulting mixture of feedstock, reactants and catalyst at least one intermediate point along the length of the riser. Preferably 2–10 catalyst injection points are supplied, one at the base of the riser and 1–9 intermediate points. About 10 to 95%, preferably about 30 to 80%, of the catalyst joins the feedstock in the lower end of the riser reactor; about 1 to 70%, and preferably about 5 to 50%, of the catalyst is injected at any single other point along the length of the riser.

Multiple catalyst injection points are utilized to effect control of the temperature of the reactants in the riser reactor. The heat of reaction in the riser reactor is endothermic due primarily to naphthene dehydrogenation as well as paraffin dehydrocyclization, and an effective temperature profile is maintained in the riser by the staged injection of catalyst particles which are provided at a temperature at least about 20° C. higher, more usually at least about 50° C. higher, and more usually from 100° to 170° C. higher than the temperature of the reactants.

The catalyst is injected into the riser through slide valves, fluidic control devices or other control devices known in the art which require relatively low pressure drop to control relative proportions of catalyst supplied to the riser at the multiple injection points. Valves to prevent backflow from the riser also may be advisable, particularly if a fluidic control system is utilized. Although no special catalyst distributor may be required, the catalyst preferably is released near the center of the riser to facilitate cross-sectional distribution. A distribution device within the riser may usefully be pitched downwardly at an angle up to and/or within the riser. Vanes or other flow-directing means may be provided within the riser to promote catalyst dispersion. The catalyst-injection points may be spaced evenly over the length of the riser, but preferably are spaced closer together at the bottom, inlet end of the riser reactor with relatively higher catalyst injection rates to compensate for the endothermic heat of reaction which usually is greater in the early stages of the reaction. Preferably regenerated catalyst particles are injected to maintain an increasing temperature profile of the reactants over the length of the riser reactor, e.g., the temperature of the reactants near the top of the riser reactor preferably is higher than that of the reactants immediately following the first catalyst injection point at the base of the riser.

Primary reforming conditions in the riser reactor comprise a temperature of from about 400° to 560° C. and a pressure of from about 50 kPa to 1 MPa absolute. Preferably the pressure ranges from about 100 to 400 kPa absolute. Residence time of reactants in the riser reactor is from about 2 seconds to 2 minutes, and preferably no more than about 30 seconds. Typically the catalyst circulation rate through the riser relative to feedstock and any gas that enters the riser will produce a flowing density of the fluidized catalyst particles of from about 50 to 320 kg/m$^3$ and a superficial velocity of about 1 to 12 m/sec for the catalyst and vapor mixture. If the reforming catalyst contains a platinum-group metal on a halogenated carrier a halogen compound, preferably an organic chloride compound, may be added to the reactants in an amount sufficient to maintain the halogen content of the catalyst.

A riser-reactor effluent comprising a riser vapor product stream and reforming catalyst particles which are partially spent (deactivated by, e.g., coke deposition and/or platinum agglomeration) is discharged from the upper end of the riser reactor 10 into the fluidized-bed reactor 20. It is within the scope of the invention that reforming of the feedstock is substantially completed in the riser reactor, in which case the fluidized-bed reactor serves essentially to separate catalyst particles from a reactor effluent which is substantially the same as the riser vapor product stream and comprises aromatized product; in this embodiment, spent catalyst particles pass through the stripping zone to the regeneration zone without substantial-deposition of additional carbonaceous material as hereinafter defined. Preferably the fluidized-bed reactor effects completion of the reforming reaction as well as separation of the resulting reactor effluent stream from catalyst particles. Any suitable riser disengaging device as known in the art may be utilized to effect separation of hydrocarbon vapors from catalyst particles including but not limited to: vented riser with cyclone (open or enclosed); tee disengager or downturned arm disengager; direct-connected riser-cyclone; suspended-catalyst separation; or vortex disengager-stripper. The preferred device is illustrated with respect to the Figure, with riser-reactor effluent passing through a transfer conduit 15 into fluidized-bed reactor 20 which contains a dense catalyst bed 21; distributor 22 preferably disburses the riser-reactor effluent over the surface of the dense bed, although it is within the scope of the invention that the distributor is within the dense bed. The dense bed has a flowing density of fluidized catalyst particles of in excess of about 320 kg/m$^3$.

Secondary reforming conditions in the catalyst bed comprise a temperature of from 450° to 560° C. and a pressure consistent with and within the range of that described earlier for the riser reactor. Displacement of hydrocarbon vapors from the catalyst is facilitated by restricting the velocity of catalyst particles through the catalyst bed. The catalyst flux or catalyst velocity through the dense bed should be less than the bubble velocity through the bed and should not exceed 30 cm/sec. Completion of the reforming reaction in the catalyst bed results in the deposition of additional carbonaceous material on the partially spent catalyst to obtain coked catalyst particles leaving the catalyst bed at the bottom of reactor vessel 20.

In a disengaging chamber 23 containing a dilute-phase zone, vapors of the reactor effluent stream are disengaged and rise upwardly while disengaged catalyst particles fall downwardly into the catalyst bed. The reactor effluent stream requires further catalyst removal, and enters a separation device in the upper portion of the fluidized-bed reactor which preferably comprises one or more cyclones 24, more preferably multiple sets of multi-stage cyclones (two in series shown for simplicity of illustration). Vapors from the first cyclone enters the second in series, and vapors from the second cyclone enter the third if necessary to effect adequate catalyst separation. Separated catalyst particles from the cyclones drop downward into the catalyst bed via dip legs 25.

The reactor effluent stream from the reactor cyclones is removed from the reactor via conduit 26 for recovery and separation. If the catalyst contains a platinum-group metal, further catalyst recovery may be useful via filter 27. The filter may be any suitable cloth, ceramic or metal filter which removes a significant portion of catalyst fines remaining in vapors which are carried through cyclone separators. Considering the potential loss of valuable catalytic components, particularly when the catalyst contains platinum-group metals, ceramic or sintered metal bayonet- or candle-type filters are preferred. See "Ceramic and Chemical Adsorbent Filters Are Breaking Temperature Records and Removing More Than Dust," Chemical Engineering, July, 1994, pp. 28–31, incorporated for its presently relevant teachings. The reactor effluent then may exchange heat with feedstock or other process streams enroute to cooling and separation in separation zone 28.

A stripper vessel 30 preferably communicates directly with the bottom of reactor vessel 20, and more preferably has a sub-adjacent location relative thereto. Coked catalyst particles cascade downward from catalyst bed 21 into the stripper vessel, usefully through a series of baffles that project transversely across the cross-section of a stripping zone 31. Preferably baffles 32 extend outwardly and downwardly from a center support pipe and offset baffles 33 extend inwardly and downwardly from the wall of stripper 30, causing falling catalyst particles to cascade from side to side. A countercurrently rising stripping medium, which optimally comprises hydrogen, is introduced through distributor 34 and desorbs hydrocarbons and other sorbed components from the surface and pores of the cascading catalyst particles. The amount of stripping medium should be adequate to displace hydrocarbons from the interstitial void area of the catalyst particles and thus is usually proportional to the volume of voids in the catalyst, and usually amounts to from about 0.02 to 0.2 moles per mole of hydrocarbon feedstock to the riser reactor. Stripped hydrocarbons and stripping medium rise through the catalyst bed 21 and disengaging chamber 23 of reactor vessel 20, joining the reactor effluent stream recovered through cyclone 24 and conduit 26 to filter 27 and separation zone 28.

Coked catalyst from catalyst bed 21 and stripped catalyst from stripping zone 31 usually is contaminated with about 0.5 mass-% or more of carbon and thus is partially or totally subjected to regeneration before being returned to riser reactor 10. To prepare suitable catalyst for reforming in the riser reactor, a stream of spent catalyst particles is withdrawn from the bottom of stripper 30 through openings 35 in a collection pipe 36 that transfers spent catalyst particles to a spent catalyst conduit 37. The flow of stripped catalyst particles through conduit 37 is controlled by valve 38 which regulates catalyst flow into a wye (Y) section via conduit 39. Optionally an inert-gas purge of the stripped catalyst is effected in a stripped-catalyst purge zone in conduit 37 and/or, preferably, in conduit 39, with a small positive flow in the conduit in the direction of the stripper 30, to purge hydrogen and any remaining hydrocarbons from the stripped catalyst particles to obtain purged stripped catalyst particles and to protect against a hydrocarbon surge from the stripper. Preferably the inert gas is nitrogen, and the resulting small flow of nitrogen containing traces of hydrocarbons could be returned to the stripper or removed from the line preferably to filtration and combustion.

Catalyst particles passing to the wye section via conduit 39 are conveyed to a regeneration zone 40, being contacted with air from a line 41 and transported upwardly through a riser 42 and discharged through a discharge device 43 into an upper portion 44 of a regenerator vessel. Compressed air from a line 45 is distributed through a distributor 46 over the cross-section of upper regenerator section 44 to combust coke from the surface of the catalyst particles and perform a partial regeneration of the catalyst. Preferably a portion of the catalyst in the regenerator is contained in a dense bed of catalyst as hereinbefore defined. Combustion byproducts, consisting primarily of CO and $CO_2$, and unreacted air components rise upwardly along with entrained catalyst through the regenerator into cyclones 47 which recover and return catalyst via the associated diplegs. Relatively catalyst-free gas is collected from the cyclones, which may comprise a single stage or two (as shown) or more stages, into an internal chamber 48 which communicates with a conduit 49 for removing spent regeneration gases and air components from the regeneration zone. Operating conditions in the regeneration zone comprise a pressure of from about 50 kPa to 1 MPa absolute, preferably from about 100 to 400 kPa absolute. In the upper section of the regenerator, temperature ranges from about 400° to 550° C. Residence time of reactants in the regenerator is from about 1 to 15 minutes. Typically the catalyst circulation rate through the regeneration zone relative to feedstock and any gas that enters the zone will produce a superficial velocity of about 0.3 to 5 m/sec, preferably 0.5 to 2 m/sec, for the catalyst and vapor mixture. Makeup catalyst preferably is injected into the regenerator in order to regulate its initial activity in reforming, although the injection point is not an essential aspect of the invention and may be, *inter alia*, in the riser reactor or fluidized-bed reactor.

Partially regenerated catalyst particles are transferred from upper section 44 to a lower section 50 through a catalyst conduit 51 at a rate regulated by a valve 52. A further quantity of compressed air is distributed over the cross-section of lower regeneration-zone section 50 by a distributor 53. Additional contact of the catalyst particles with the air stream performs a complete regeneration of the catalyst in the lower section at a temperature of from about 450° to 700° C., preferably about 550° to 650° C., by removing any coke that was not completely combusted in upper section 44 from the surface of the catalyst particles. Entrained catalyst particles and flue gas from the lower section 50 pass into upper section 44 through gas vents 54. Hot regenerated reforming-catalyst particles are withdrawn from lower section 50 through conduit 55 as controlled by valve 56 which regulates catalyst flow into a wye section via conduit 57. Specific details of transferring catalyst from a stripping section to a regeneration zone, regenerating the catalyst and returning catalyst to a reactor riser are well known to those skilled in the art and any such details may be used to supplement or modify the teachings relating to the present invention. In the embodiment of the invention wherein the catalyst contains a platinum-group metal, it is within the scope of the invention that the catalyst be contacted with a halogen compound during and/or after the regeneration step to obtain a metals-redistributed catalyst. This halogen-contacting step may be carried out in the regenerator, preferably in the lower section 50, or in a separate vessel following regeneration. The halogen preferably is chlorine and/or a chloride compound such as HCl, and is present in a concentration of about 0.0005 to 5 mole-% Cl-along with about 0.002 to 25 mole-% $H_2O$ in a gas also containing oxygen and nitrogen. The contacting is carried out for a period of about 1 to 30 minutes at a temperature of about 500° to 650° C. and a pressure consistent with that of the regeneration to achieve redistribution of the platinum-group metal on the catalyst. Optionally, the metals-redistributed catalyst particles are dried with air at conditions within the above limits.

Preferably the regenerated catalyst is subjected to a inert-gas purge in a purge zone conduits 55 or 57, with a small positive flow in the conduit in the direction of the lower regenerator section 50, to purge oxygen-containing gas from the interstices of the regenerated catalyst and obtain a purged regenerated catalyst. The purge gas preferably is nitrogen, and the resulting small flow of nitrogen preferably is vented from the line to combustion. Regenerated-catalyst flow is controlled by valve 56.

Optionally, after passing the valve 56, the purged catalyst is contacted in a reduction zone with a reduction gas comprising hydrogen to effect reduction of the oxidized catalyst and to deplete the amount of nitrogen diluent sent to the catalytic reforming process. Either or both of the purge zone and reduction zone may be contained in conduits 55 or 57 or may comprise vessels communicating with these lines. The reduced reforming-catalyst particles after the optional purge and reduction steps are transferred to the riser reactor 10 as described hereinabove.

Separation of the reactor effluent in product-recovery zone 28 may be according to any means known in the art, preferably comprising separation of a hydrogen-rich gas at near-ambient temperature and stripping in a fractionator to separate light hydrocarbons from the aromatized product. Using techniques and equipment known in the art, the filtered reactor-effluent vapors preferably are passed through a cooling zone to a separation zone. In the separation zone, typically maintained at about 0° to 65° C., a hydrogen-rich gas is separated from a liquid phase. The resultant hydrogen-containing stream can then be recycled through suitable compressing means back to the riser reactor, but usually the entire stream is directed to other refinery hydrogen uses or to fuel. The liquid phase from the separation zone is normally withdrawn and processed in a fractionating system in order to adjust the concentration of light hydrocarbons and produce an aromatics-rich saturated product.

The light hydrocarbons separated from the aromatics-rich product comprise propane and usually butanes if the product is to be blended into gasoline, and may comprise pentanes if the product is to be further processed to recover aromatic hydrocarbons.

The reforming process produces an aromatized product stream containing relatively small amounts of olefins, usually less than about 10 mass-% and more usually less than about 5 mass-% of the $C_{5+}$ (pentanes and heavier hydrocarbons) product. The aromatics content typically is within the range of about 60 to 99 mass %, usually at least about 80 mass-%, and more usually about 90 mass-% or more, of the $C_{5+}$ aromatized product. The composition of the aromatics will depend principally on the feedstock composition and operating conditions, and generally will consist principally of aromatics within the $C_6$–$C_{12}$ range. Benzene, toluene and $C_8$ aromatics are preferred components of the aromatics portion of the product.

The intermediate stream is converted in the riser reactor using a catalyst comprising a refractory support which usually is a porous, adsorptive, high-surface-area material having a surface area of about 25 to about 500 $m^2/g$. The porous carrier material should also be uniform in composition and relatively refractory to the conditions utilized in the hydrocarbon conversion process. By the terms "uniform in composition" it is meant that the support be unlayered, has no concentration gradients of the species inherent to its composition, and is completely homogeneous in composition. Thus, if the support is a mixture of two or more refractory materials, the relative amounts of these materials will be constant and uniform throughout the entire support. It is intended to include within the scope of the present invention carrier materials which have traditionally been utilized in dual-function hydrocarbon conversion catalysts such as:

(1) refractory inorganic oxides such as alumina, magnesia, titania, zirconia, chromia, zinc oxide, thoria, boria, silica-alumina, silica-magnesia, chromia-alumina, alumina-boria, silica-zirconia, etc.;

(2) ceramics, porcelain, bauxite;

(3) silica or silica gel, silicon carbide, clays and silicates which are synthetically prepared or naturally occurring, which may or may not be acid treated, for example attapulgus clay, diatomaceous earth, fuller's earth, kaolin, or kieselguhr;

(4) crystalline zeolitic aluminosilicates, such as X-zeolite, Y-zeolite, mordenite, O-zeolite, Q-zeolite or L-zeolite, either in the hydrogen form or most preferably in nonacidic form with one or more alkali metals occupying the cationic exchangeable sites;

(5) non-zeolitic molecular sieves, such as aluminophosphates or silico-alumino-phosphates; and (6) combinations of one or more materials from one or more of these groups.

Preferably the refractory support comprises one or more inorganic oxides, having an apparent bulk density of about 0.3 to about 1.0 g/cc and surface area characteristics such that the average pore diameter is about 20 to 300 angstroms, the pore volume is about 0.1 to about 1 cc/g, and the surface area is about 100 to about 500 m².

The preferred refractory inorganic oxide for use in the present invention is alumina. Suitable alumina materials are the crystalline aluminas known as the gamma-, eta-, and theta-alumina, with gamma- or eta-alumina giving best results. A particularly preferred alumina is that which has been characterized in U.S. Pat. Nos. 3,852,190 and 4,012,313 as a by-product from a Ziegler higher alcohol synthesis reaction as described in Ziegler's U.S. Pat. No. 2,892,858. For purposes of simplification, such an alumina will be hereinafter referred to as a "Ziegler alumina". Ziegler alumina is presently available from the Vista Chemical Company under the trademark "Catapal" or from Condea Chemie GmbH under the trademark "Pural." This material is an extremely-high-purity pseudoboehmite which, after calcination at a high temperature, has been shown to yield a high purity gamma-alumina.

The preferred alumina powder can be formed into any desired shape or type of carrier material known to the skilled routiner in the art to be fluidizable in the context of the present invention, preferably spray-dried particles, oil-dropped spheres as disclosed in U.S. Pat. No. 2,620,314, or finely divided agglomerates derived from agitation of plastic particles in oil according to U.S. Pat. No. 3,515,684. The catalyst preferably is prepared by forming an alumina slurry which is spray dried, as taught in the art and described below, to form particles of the required size distribution.

A non-noble metal is a preferred component of the present catalyst. Such non-noble metals may comprise at least one of non-noble Group VIII (IUPAC 8–10) metals, Group VIIB (IUPAC 7) metals, and Group IVA(IUPAC 14) metals [See Cotton and Wilkinson, *Advanced Inorganic Chemistry,* John Wiley & Sons (Fifth Edition, 1988)]. One or more of a non-noble Group VIII (IUPAC 8–10) metal, manganese, molybdenum, tin, germanium and rhenium are preferred, with nickel being especially preferred. Generally the non-noble metal is present in a concentration of from about 0.01 to 5 mass % of the finished catalyst on an elemental basis, with a concentration of from about 0.05 to 2 mass % being preferred. If both a platinum-group metal and a non-noble metal are present, the ratio of platinum-group metal to non-noble metal is from about 0.2 to 20, and preferably from about 0.5 to 10, on an elemental-metal basis.

The non-noble metal may be incorporated into the porous carrier material in any suitable manner, such as coprecipitation, ion exchange or impregnation. A preferred method is to impregnate the carrier composite of sieve and binder with a solution of water-soluble metal-modifier compounds, such as one or more of the nitrates, sulfates, chlorates, chlorides, and carbonates. Optionally, the impregnation solution contains organic solvents such as ethanol, isopropanol, tetrahydrofuran, an organic acid, or a nonionic surface-active agent to aid in controlling metal distribution.

One embodiment of the present catalyst comprises a sulfided non-noble metal of Group VIII (IUPAC 8–10) of the Periodic Table and alumina. Such catalysts tolerate sulfur compounds in the reforming feedstock to a greater extent than catalysts containing a platinum-group metal, and reforming of an untreated feedstock may be attractive. Preferably the catalyst consists essentially of sulfided nickel on an alumina support. The preferred nickel component may be incorporated into the catalyst composite in any suitable manner known to result in a relatively uniform distribution of the available nickel in the carrier material, e.g., coprecipitation, cogelation, ion exchange, or impregnation, at any stage of catalyst preparation. The nickel preferably is incorporated into the composite as a water-soluble, decomposable and reducible compound such as a nickel or hexaminenickel(II) halide, nitrate, acetate or formate, especially nickel chloride or nitrate. Nickel is present in the finished catalyst in an amount of about 0.1 to 5 mass-%, preferably about 0.5 to 2 mass-%, on an elemental basis.

Sulfiding of the non-noble Group VIII metal may be effected in any manner which results in substantially all of the catalytically available non-noble metal being present in the catalyst as the sulfide. Preferably sulfiding of the preferred nickel catalyst is carried out after the catalyst has been oxidized and reduced. The catalyst also may be sulfided during startup or operation of the reforming process. A decomposable sulfur compound which does not contain oxygen is used, such as a mercaptan, sulfide, disulfide, thiophene, dithioacid, thioaldehyde, thioketone, or preferably hydrogen sulfide. The sulfiding is carried out at conditions including a temperature of about 20° to 600° C., preferably about 350° to 550° C., and for a time of about 0.1 to 100 hours at a pressure suitable for sulfiding of substantially all of the available nickel. Further details of nickel incorporation and sulfiding are described in U.S. Pat. No. 4,131,536, drawn to a multimetallic catalyst comprising sulfided nickel, incorporated herein by reference thereto.

Yet another catalyst embodiment comprises a supported Group VIB (IUPAC 6) metal carbide or nitride. Preferred metals are molybdenum and tungsten, and molybdenum carbide is an especially preferred catalyst component. The catalyst support preferably comprises alumina, which may be modified by a passivating layer of ceramic silicon carbide as disclosed in U.S. Pat. No. 5,338,716 which is hereby incorporated by reference. The catalyst may be composited in any suitable manner known in the art including one or more of coextrusion, impregnation and pyrolysis.

An alternative reforming catalyst comprises a platinum-group metal component, i.e., one or more of platinum, palladium, ruthenium, rhodium, iridium, and osmium. One or more of platinum and palladium are preferred, with a platinum component being especially preferred. The platinum group metal may exist within the catalyst as a compound such as the oxide, sulfide, halide, or oxyhalide, in chemical combination with one or more other ingredients of the catalytic composite, or as an elemental metal. Best results are obtained when substantially all of the platinum-group metal exists in the catalytic composite in a reduced state. The platinum-group metal if present generally comprises from about 0.05 to 5 mass % of the catalytic composite, preferably 0.05 to 2 mass %, calculated on an elemental basis.

The platinum-group metal component of the alternative catalyst may be incorporated in the porous carrier material in any suitable manner, such as coprecipitation, ion exchange or impregnation. The preferred method of preparing the catalyst involves the utilization of a soluble, decomposable compound of platinum-group metal to impregnate the carrier material in a relatively uniform manner. For example, the component may be added to the support by commingling the latter with an aqueous solution of chloroplatinic or chloroiridic or chloropalladic acid. Other water-soluble compounds or complexes of platinum-group metals may be employed in impregnating solutions and include ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), palladium chloride, palladium nitrate, palladium sulfate, diamminepalladium (II) hydroxide, tetramminepalladium (II) chloride, and the like. The utilization of a platinum, iridium, rhodium, or palladium chloride compound, such as chloroplatinic, chloroiridic or chloropalladic acid or rhodium trichloride hydrate, is preferred since it facilitates the uniform distribution of the metallic components throughout the carrier material. In addition, it is generally preferred to impregnate the carrier material after it has been calcined in order to minimize the risk of loss of the valuable platinum-group metal.

A reforming catalyst which comprises a platinum-group metal also may contain a halogen component, usually incorporated in conjunction with metal components. The halogen component may be either fluorine, chlorine, bromine or iodine or mixtures thereof. Chlorine is the preferred halogen component. The halogen component is generally present in a combined state with the inorganic-oxide support. The halogen component is preferably well dispersed throughout the catalyst and, when present, may comprise from more than 0.2 to about 15 wt. %. calculated on an elemental basis, of the final catalyst.

The reforming catalyst generally will be dried at a temperature of from about 100° to 320° C. for about 0.5 to 24 hours, followed by oxidation at a temperature of about 300° to 550° C. (preferably above about 350° C.) in an air atmosphere for 0.5 to 10 hours. Preferably the oxidized catalyst is subjected to a substantially water-free reduction step at a temperature of about 300° to 550° C. (preferably above about 350° C.) for 0.5 to 10 hours or more. The duration of the reduction step should be only as long as necessary to reduce the platinum, in order to avoid predeactivation of the catalyst, and may be performed in-situ as part of the plant startup if a dry atmosphere is maintained. Further details of the preparation and activation of embodiments of the sulfur-sensitive reforming catalyst are disclosed, e.g., in U.S. Pat. No. 4,619,906 (Lambert et al) and U.S. Pat. No. 4,822,762 (Ellig et al.), which are incorporated into this specification by reference thereto.

It is within the scope of the invention that the reforming catalyst contains one or more molecular sieves. Suitable sieves may comprise dealuminated or ultrastable molecular sieves including those described in U.S. Pat. Nos. 4,401,556, 4,869,803 and 4,795,549 which are incorporated herein by reference for their teaching as to the preparation of dealuminated Y zeolites. Beta zeolite as described *inter alia* in U.S. Patent Re 28,341 or MFI as characterized in U.S. Pat. No. 3,702,886 also can be used in the subject catalyst as a portion or all of the molecular-sieve component. One or more non-zeolitic molecular sieves as disclosed in U.S. Pat. No. 5,346,611, incorporated by reference, may be employed as a reforming catalyst component.

An alternative embodiment of the reforming catalyst is an aromatization catalyst containing a non-acidic large-pore molecular sieve. Suitable molecular sieves generally have a maximum free channel diameter or "pore size" of 6 Å or larger, and preferably have a moderately large pore size of about 7 to 8 Å. Such molecular sieves include those characterized as AFI, BEA, FAU or LTL structure type by the IUPAC Commission on Zeolite Nomenclature, with the LTL structure being preferred. It is essential that the preferred L-zeolite be non-acidic, as acidity in the zeolite lowers the selectivity to aromatics of the finished catalyst. In order to be "non-acidic," the zeolite has substantially all of its cationic exchange sites occupied by nonhydrogen species. Preferably the cations occupying the exchangeable cation sites will comprise one or more of the alkali metals, although other cations including alkaline earth metals may be present. An especially preferred nonacidic L-zeolite is potassium-form L-zeolite.

L-zeolite of the alternative preferred aromatization catalyst is composited with a binder in order to provide a convenient form for use in the catalyst of the present invention. A refractory inorganic oxide binder is suitable, with one or more of silica, alumina or magnesia being preferred binder materials. Amorphous silica is especially preferred, and excellent results are obtained when using a synthetic white silica powder precipitated as ultra-fine spherical particles from a water solution. An alkali metal component is a highly preferred constituent of the aromatization catalyst. One or more of the alkali metals, including lithium, sodium, potassium, rubidium, cesium and mixtures thereof, may be used, with potassium being preferred. The alkali metal optimally will occupy essentially all of the cationic exchangeable sites of the non-acidic L-zeolite as described hereinabove. Surface-deposited alkali metal also may be present as described in U.S. Pat. No. 4,619,906, incorporated herein by reference thereto.

The fluidizable catalyst particles preferably are prepared by spray drying a catalyst slurry, most preferably comprising alumina, as known in the art. Particle size, density and spherocity are controlled by, *inter alia,* solids content of the slurry, nature of the atomizer (e.g., single-fluid nozzle, two-fluid nozzle, or wheel atomizer), and size and shape of the drying chamber. Catalyst employed in the riser reactor and/or fluidized-bed reforming vessel comprises finely divided particles optimally of a size substantially within the range of about 10 to 200 microns (elm), preferably with about 80% or more of the particles within a size range of about 20 to 100 microns, and more preferably with an average particle size of between about 60 and 80 microns. Reforming catalysts having a small particle size are particularly effective for dehydrogenation of naphthenes to aromatics, as this is a diffusion-limited reaction in contrast to the hydrocracking of paraffins. Selection of the range of particle sizes therefore is a balance between the advantage of smaller size to minimize the diffusion limitation against losses of smaller particles in effluent vapors and concomitant effect on suitable gas velocities. See the teachings of U.S. Pat. No. 3,849,289, incorporated herein by reference. A benefit of this feature of small-particle catalyst is that the metals-containing catalyst particles may be diluted with non-metals-containing particles, e.g., alumina, in the fluidized-bed process; this provides an additional heat sink to maintain the reaction temperature. The ratio of the latter dilution particles to catalyst preferably is in the range of 0–10 on a mass basis.

It is within the scope of the invention that the present process comprises part of a hybrid reforming process in combination with fixed-bed or moving-bed reforming zones. Hybrid reforming processes are disclosed in U.S. Pat. Nos. 3,849,289 and 4,985,132, incorporated herein by reference. A hybrid reforming process according to the present invention preferably comprises a riser reactor and fluidized-bed reforming followed by moving-bed reforming with continuous catalyst regeneration.

EXAMPLES

The following examples are presented to demonstrate the invention and to illustrate certain specific embodiments thereof, and should not be construed to limit the scope of the invention as set forth in the claims. There are many possible other variations, as the skilled routineer will recognize, which are within the spirit of the invention.

Example I

A feedstock was prepared for comparative pilot-plant testing. Technical-grade normal hexane and pure-grade normal heptane were obtained from Phillips Petroleum and blended in a nominal 50/50 mass ratio. The composition of the blend was as follows, in mass-%:

|  |  |
|---|---|
| Normal hexane | 48.13 |
| Normal heptane | 50.76 |
| Methylcyclopentane | 0.91 |
| Cyclohexane | 0.10 |
| Benzene | 0.10 |

Example II

Catalyst useful in a riser reactor of the invention was prepared by spray drying an alumina slurry containing platinum and tin. Chloroplatinic acid and tin chloride were added to a peptized slurry of Catapal alumina. The catalyst was spray dried to provide a catalyst having an average size of about 60 microns and having the following composition in mass-%:

|  |  |
|---|---|
| Platinum | 0.30 |
| Tin | 0.15 |

The catalyst was tested in a fluidized-bed pilot plant. Feed rate was controlled by a Whitey pump with a bypass pump-around loop. Feedstock passed through a spiral preheat coil and a ball-type distributor upflow into the reactor. Products from the reaction pass through a porous metal filter impervious to catalyst and a water-cooled exchanger into a product receiver maintained at dry-ice/acetone temperature. A backpressure regulator downstream of the receiver controlled the reactor pressure.

The pilot-plant tests were carried out in a series of runs at about 200 kPa pressure, catalyst/oil ratios of about 20 and temperatures as indicated below. Between runs the catalyst was regenerated using 2 mole-% oxygen in nitrogen and purged with nitrogen and hydrogen.

Carbon-balanced results were as follows for the four tests of the subject catalyst:

| Temperature, ° C. | 521 | 532 | 544 |
|---|---|---|---|
| Yields, mass-%: |  |  |  |
| hydrogen | 5.6 | 6.3 | 6.1 |
| coke | 7.7 | 7.5 | 8.8 |
| $C_5-$ paraffins | 14.4 | 11.4 | 17.7 |
| $C_6+$ nonaromatics | 12.7 | 9.5 | 4.2 |
| benzene | 17.6 | 19.6 | 24.6 |
| toluene | 34.0 | 38.5 | 35.2 |
| $C_8+$ aromatics | 8.0 | 7.2 | 3.4 |
| Total aromatics, mass-% | 59.7 | 65.3 | 63.2 |

Example III

A catalyst and process of the prior art were tested to provide control data for the test Example II. The catalyst comprised a spherical chlorided alumina base and had the following metals contents:

|  |  |
|---|---|
| Platinum | 0.38 |
| Tin | 0.30 |

A paraffinic Middle East $C_6$–$C_8$ naphtha was used as feedstock in the control test and had a composition as follows in mass-%:

|  |  |
|---|---|
| Paraffins | 78.2 |
| Naphthenes | 18.4 |
| Aromatics | 3.4 |

Reforming tests were carried out at a pressure of 790 kPa, temperature of 525° C., and space velocity of 1.0 $hr^{-1}$. Results were as follows:

| Yields, mass-% |  |
|---|---|
| hydrogen | 3.2 |
| $C_5-$ paraffins | 40.9 |
| $C_6+$ nonaromatics | 4.3 |
| benzene | 13.5 |
| toluene | 35.6 |
| $C_8+$ aromatics | 2.5 |
| Total aromatics, mass-% | 51.6 |

The process of the invention thus demonstrated an aromatics-yield improvement of about 15 to 20% relative to the aromatics yield of the control process. Adjusting yields of the control process by assuming theoretical aromatics yields from naphthenes and aromatics in the feed, the yield of aromatics on paraffins in the control process is calculated at about 41 mass-%. The process of the invention thus shows a dramatic improvement in yields of aromatics from paraffins.

Example IV

An economic comparison is presented in the following examples of fluidized-bed reforming according to the present invention and moving-bed reforming with continuous catalyst regeneration as a control. Yields and operating costs for the fluidized-bed reforming unit were derived from the pilot-plant tests reported in Example II and a conceptual process design. Parameters for the moving-bed reforming with continuous catalyst regeneration were derived from pilot-plant experience using a catalyst as described in Example III. The feedstock used to prepare the comparison was a $C_6$–$C_7$ fraction derived from Light Arabian naphtha having the following composition in mass-%:

|  |  |
|---|---|
| $C_6$ paraffins | 26.2 |
| $C_6$ naphthenes | 7.8 |
| Benzene | 1.3 |
| $C_7+$ paraffins | 52.2 |
| $C_7+$ naphthenes | 10.4 |
| Toluene | 2.1 |

Operating conditions were selected to present each of the comparative reforming processes in a favorable manner:

|  | Invention | Control |
| --- | --- | --- |
| Pressure, kPa | 200 | 450 |
| Temperature, ° C. | 527 | 532 |
| Residence time, sec | 15 | NA |
| Space velocity, hr$^{-1}$ | NA | 1.5 |

Fluidized-bed reforming parameters were derived on the basis of the absence of recycle hydrogen; regeneration of the catalyst at 650° C. was assumed.

The economics were derived based on a naphtha feedstock value of $165/metric ton and the following values for products and utilities:

| | |
| --- | --- |
| Benzene | $300/ton |
| Toluene | $260/ton |
| C$_8$+ aromatics | $230/ton |
| C$_5$+ nonaromatics | $150/ton |
| LPG (C$_3$/C$_4$) | $130/ton |
| Fuel gas | $110/ton |
| Hydrogen-rich gas (94%) | $600/ton |
| Power | $0.06/kWh |
| Fuel | $2.10/GJ |

Example V

Yields and operating parameters were calculated as follows for the comparative processes in mass-%:

|  | Invention | Control |
| --- | --- | --- |
| Hydrogen | 6.44 | 4.00 |
| C$_1$–C$_4$ paraffins | 8.63 | 20.20 |
| C$_5$+ nonaromatics | 4.86 | 17.24 |
| Benzene | 18.94 | 13.56 |
| Toluene | 50.07 | 44.40 |
| C$_8$ aromatics | 4.26 | 0.60 |
| Coke | 6.80 | — |
|  | 100.00 | 100.00 |
| Total aromatics | 73.27 | 58.56 |

Comparative requirements of the most significant utilities were calculated as follows:

|  | Invention | Control |
| --- | --- | --- |
| Electric power, kW | 14,940 | 13,520 |
| Fuel, GJ/hr | 57 | 206 |

Example VI

Comparative economics were calculated, applying the above yields, utilities and economic parameters to reforming units with capacities of 20,000 barrels per stream day with an operating efficiency of 8000 hours per year:

| Millions of Dollars/Year: | Invention | Control |
| --- | --- | --- |
| Income: | | |
| Benzene | 42.2 | 30.0 |
| Toluene | 96.5 | 85.7 |
| C$_8$+ aromatics | 7.2 | 1.1 |
| C$_5$+ nonaromatics | 5.4 | 19.2 |
| LPG | 4.1 | 13.1 |
| Fuel gas | — | 3.7 |
| Hydrogen | 48.5 | 26.9 |
| Total Income | 203.9 | 179.7 |
| Expenses: | | |
| Feedstock | 122.4 | 122.4 |
| Electric power | 7.2 | 6.7 |
| Fuel | 1.0 | 3.5 |
| Catalyst | 1.7 | 0.6 |
| Total Expenses | 132.3 | 133.2 |
| Gross Margin | 71.6 | 46.5 |
| Differential Margin of Invention | | 25.1 |

The fluidized-bed process thus shows an advantage in aromatics production of nearly 15 mass-% on feedstock, or about 25% higher than yields of the known art, with a concomitant advantage in processing gross margin according to the above economic analysis.

Example VI

The features of the prereactor zone of the present invention were considered through modeling of the effect on differential temperature through a riser reactor. Kinetic relationships used in determining this effect were derived from pilot-plant and commercial data. The effect on the riser reactor was calculated at a catalyst-to-oil mass ratio of 20.

Figure 3:
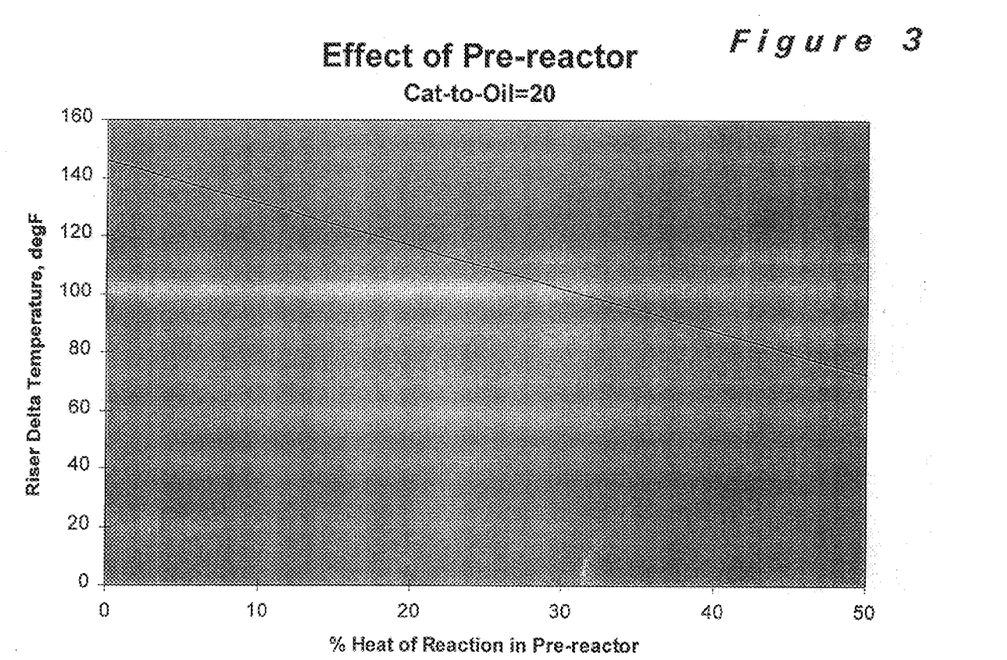
FIG. 3 shows the effect of the prereactor zone on the differential temperature in the riser reactor.

The relationship of the proportion of the total reforming heat of reaction in the prereactor to the differential temperature in the riser reactor is shown in FIG. 3.

The foregoing description sets forth essential and preferred features of this invention which can be adapted in the context of a variety of applications and arrangements, as can be appreciated by the skilled routineer, without departing from the scope and spirit of the claims hereafter presented.

We claim:

1. A process for the catalytic reforming of a hydrocarbon feedstock to obtain an aromatized product comprising the steps of:

(a) contacting the hydrocarbon feedstock with a prereactor catalyst comprising a supported platinum-group metal in a prereactor zone, comprising one or more reactors selected from the group consisting of fixed-bed and moving-bed reactors, at prereactor conditions and heating effluent from the reactors to obtain a prereacted intermediate stream;

(b) charging the prereacted intermediate stream to a riser reactor, introducing regenerated reforming-catalyst particles and transporting the feedstock and catalyst particles upwardly through the riser reactor at primary reforming conditions and thereby converting the feedstock to obtain a riser vapor product stream and produce spent catalyst particles by the deposition of coke on the catalyst particles;

(c) withdrawing the riser vapor product stream from the riser reactor and recovering the aromatized product; and, (d) transferring the spent catalyst particles to a regeneration zone and contacting the catalyst particles with a regeneration gas to remove at least a portion of the carbonaceous material from the catalyst and obtain regenerated reforming-catalyst particles.

2. The process of claim 1 wherein the hydrocarbon feedstock is a naphtha feedstock.

3. The process of claim 1 wherein the prereactor conditions comprise a pressure of from about 100 kPa to 1 MPa absolute, space velocity of from about 0.2 to 20 $hr^{-1}$, and operating temperature of from about 260° to 560° C.

4. The process of claim 1 wherein the primary reforming conditions comprise a pressure of from about 100 to 400 kPa absolute and a temperature of from about 450° to 560° C.

5. The process of claim 1 wherein free hydrogen is present in the prereactor zone in a molar ratio to the hydrocarbon feedstock of from about 0.1 to 10.

6. The process of claim 1 comprising charging the prereacted intermediate stream to the riser reactor without separation of free hydrogen from the prereactor zone.

7. The process of claim 1 wherein the reforming catalyst is present in the riser reactor at a flowing density of between 50 and 320 $kg/M^2$.

8. The process of claim 1 wherein the aromatized product contains at least about 80 mass-% aromatic hydrocarbons on a $C_5+$ basis.

9. The process of claim 1 wherein the aromatized product contains at least about 90 mass-% aromatic hydrocarbons on a $C_5+$ basis.

10. A process for the catalytic reforming of a hydrocarbon feedstock to obtain an aromatized product comprising the steps of:
  (a) contacting the hydrocarbon feedstock with a prereactor catalyst comprising a supported platinum-group metal in a prereactor zone, comprising one or more reactors selected from the group consisting of fixed-bed and moving-bed reactors, at prereactor conditions and heating effluent from the reactors to obtain a prereacted intermediate stream;
  (b) charging the prereacted intermediate stream to a riser reactor, 15 introducing regenerated reforming-catalyst particles at two or more injection points, and transporting the feedstock and catalyst particles upwardly through the riser reactor at primary reforming conditions and thereby converting the feedstock to obtain a riser vapor product stream and produce partially spent catalyst particles by the deposition of coke on the catalyst particles;
  (c) discharging a mixture of partially spent catalyst particles and vapor products from a discharge end of the riser into a fluidized-bed reforming vessel and contacting the riser vapor product stream with the partially spent catalyst particles at secondary reforming conditions in the fluidized-bed reforming vessel to produce a reactor effluent stream and coked catalyst particles having additional carbonaceous material deposited thereon;
  (d) withdrawing the reactor effluent stream from the reactor vessel and separating the reactor effluent stream to recover the aromatized product. (e) transferring the coked catalyst particles to a regeneration zone and contacting the catalyst particles with a regeneration gas to remove at least a portion of the carbonaceous material from the catalyst and obtain regenerated reforming-catalyst particles.

11. The process of claim 10 comprising charging the prereacted intermediate stream to the riser reactor without separation of free hydrogen from the prereactor zone.

12. A process for the catalytic reforming of a hydrocarbon feedstock to obtain an aromatized product comprising the steps of:
  (a) contacting the hydrocarbon feedstock with a prereactor catalyst comprising a supported platinum-group metal in a prereactor zone, comprising one or more reactors selected from the group consisting of fixed-bed and moving-bed reactors, at prereactor conditions and heating effluent from the reactors to obtain a prereacted intermediate stream;
  (b) charging the prereacted intermediate stream to a riser reactor, introducing reduced reforming-catalyst particles at two or more injection points, and transporting the feedstock and catalyst particles upwardly through the riser reactor at primary reforming conditions and thereby converting the feedstock to obtain a riser vapor product stream and produce partially spent catalyst particles by the deposition of coke on the reduced catalyst particles;
  (c) discharging a mixture of partially spent catalyst particles and vapor products from a discharge end of the riser into a fluidized-bed reforming vessel and contacting the riser vapor product stream with the partially spent catalyst particles at secondary reforming conditions in the fluidized-bed reforming vessel to produce a reactor effluent stream and coked catalyst particles having additional carbonaceous material deposited thereon;
  (d) withdrawing the reactor effluent stream from the reactor vessel and separating the reactor effluent stream to recover the aromatized product;
  (e) passing the coked catalyst particles from the reactor vessel into a stripping zone, directing a stripping medium countercurrently to the spent catalyst particles and recovering stripped catalyst particles;
  (f) transferring the stripped catalyst particles to a regeneration zone and contacting the catalyst particles with a regeneration gas to remove at least a portion of the carbonaceous material from the catalyst and obtain regenerated reforming-catalyst particles; and,
  (g) passing the regenerated catalyst particles to a reduction zone and contacting the catalyst particles with a reduction gas comprising hydrogen to obtain reduced reforming-catalyst particles for transfer to the riser reactor.

13. The process of claim 12 further comprising contacting stripped catalyst particles in a coked-catalyst purge zone with an inert gas to obtain purged stripped catalyst particles which are passed to the regeneration zone.

14. The process of claim 12 further comprising contacting regenerated catalyst particles in a regenerated-catalyst purge zone with an inert purge gas to obtain purged regenerated gas particles which are passed to the reduction zone.

15. The process of claim 14 further comprising contacting the regenerated catalyst particles in a chlorination zone to redistribute one or more metals on the catalyst and produce metals-redistributed reforming-catalyst particles which are passed to the regenerated-catalyst purge zone.

16. The process of claim 12 wherein the reforming catalyst comprises one or more refractory inorganic oxides.

17. The process of claim 16 wherein the refractory inorganic oxide comprises alumina.

18. The process of claim 16 wherein the reforming catalyst comprises a non-noble metal component.

19. The process of claim 18 wherein the non-noble metal component comprises one or more Group VIII (IUPAC 8–10) metals.

20. The process of claim 19 wherein the non-noble metal component comprises sulfided nickel.

* * * * *